C. R. Stuart. Single Harness.
No. 120,344.  Patented Oct. 24, 1871.
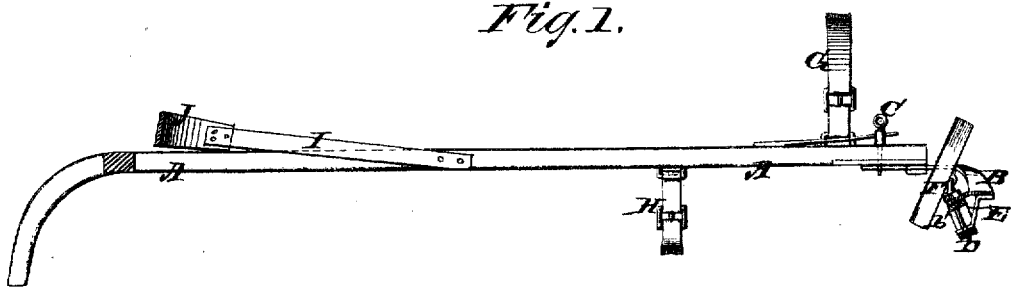
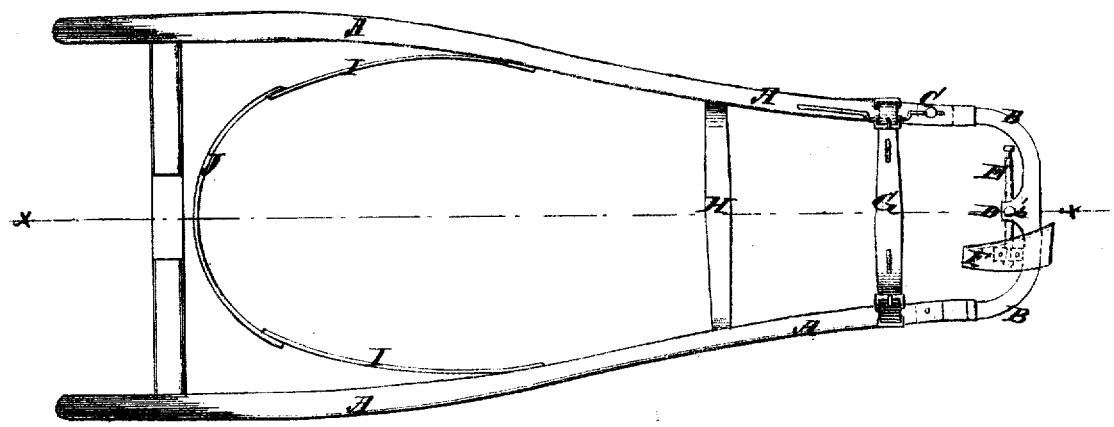

UNITED STATES PATENT OFFICE.

CHARLES RICHARD STUART, OF WINSLOW, MAINE.

IMPROVEMENT IN SINGLE HARNESS.

Specification forming part of Letters Patent No. 120,344, dated October 24, 1871; antedated October 21, 1871.

*To all whom it may concern:*

Be it known that I, CHARLES RICHARD STUART, of Winslow, (Waterville Post Office,) in the county of Kennebec and State of Maine, have invented a new and useful Improvement in Single Harness; and I do hereby declare that the following is a full, clear, and exact description thereof, which will enable others skilled in the art to make and use the same, reference being had to the accompanying drawing forming part of this specification, in which—

Figure 1 is a longitudinal section of my improved harness as attached to a pair of thills, taken through the line $x\ x$, Fig. 2. Fig. 2 is a top view of the same, one of the breast-pads being removed.

Similar letters of reference indicate corresponding parts.

My invention has for its object to furnish an improved single harness for attaching a horse to a pair of thills, which shall be simple in construction, cheaper, more comfortable for the horse, and which will give the horse a better control over the carriage; and it consists in the construction and combination of the various parts of the harness, as hereinafter more fully described.

A represents the thills, the rear ends of which are connected by a cross-bar in the ordinary manner. B is a curved bar, one end of which is pivoted to the forward end of one of the thills A. The rear end of the bar B is passed into a keeper attached to the forward end of the other thill A, where it is secured in place by a pin, C, which may be secured in place by a spring or other convenient means. Upon the inner side of the middle part of the bar B is formed a lug, $b'$, through which passes a bolt, D, the lower end of which is supported by a short brace or keeper attached to the said bar B. E is a bar, the middle part of which is pivoted to the bar B by the bolt D. The bar E is made with a brace-loop extending down to the lower part of the bolt D, so as to hold the said bar E always in a horizontal position. To the ends of the pivoted bar E are pivoted the breast-pads F, which may be wooden pads or stuffed pads, as may be desired. The pads F should be made of such a form as to fit upon the breast of the horse, of such a strength as to preserve their form, and of such a size as to present a proper amount of bearing-surface to the horse's breast. By this construction, as the horse moves forward he presses his breast or shoulders against the pads F and thus applies his power to the forward ends of the thills A. The thills are supported by the strap G, which passes over the withers of the horse, and which should be made in two parts connected by a buckle, so that it may be conveniently lengthened and shortened, as the height of the horse may require. The ends of the strap G are attached to the thills A. H is the belly-band, the ends of which are attached to the thills A, and which should also be made in two parts, connected to each other by a buckle, so that it may be conveniently lengthened and shortened, as may be required. I are two elastic bars or springs, which may be made of metal or wood, and the forward ends of which are attached to the middle parts of the thills A. The parts I incline upward, as shown in Fig. 1, and are curved or inclined inward, as shown in Fig. 2, so that their rear parts may overlap the horse's hips. The rear ends of the bars or springs I are connected with each other by a leather strap, J, which passes around the horse's hips. The bars or springs I should be so formed that they will have a lateral but not a vertical spring. The springs I and strap J thus form the breeching or hold-back device.

By this construction, when the horse is pulling, the breeching will not be in contact with him, and when holding back the breast-pads F will be withdrawn from his breast, so that the only part of the harness that will be constantly in contact with the horse will be the supporting-strap G.

Having thus described my invention, I claim as new and desire to secure by Letters Patent—

1. The bar B $b'$, bolt D, bar E, and breast-pads F, when all are constructed and arranged together as and for the purpose specified.

2. An improved harness, formed by the combination of the bar B, pivoted bar E, breast-pads F, supporting or neck-strap G, belly-band H, springs I, and strap J, in combination with each other, to adapt them for attachment to a pair of thills, substantially as herein shown and described, and for the purposes set forth.

CHARLES R. STUART.

Witnesses:
DANIEL LIBBEY, Jr.,
LUTHER W. PACKARD. (72)